United States Patent [19]

Dunning

[11] Patent Number: 5,333,279
[45] Date of Patent: Jul. 26, 1994

[54] SELF-TIMED MESH ROUTING CHIP WITH DATA BROADCASTING

[75] Inventor: Dave Dunning, Portland, Oreg.

[73] Assignee: Intel Corporation, Santa Clara, Calif.

[21] Appl. No.: 892,535

[22] Filed: Jun. 1, 1992

[51] Int. Cl.5 ............................................. G06F 13/14
[52] U.S. Cl. .............................. 395/325; 364/DIG. 1;
 364/229.5; 364/284; 364/284.3
[58] Field of Search ........................ 395/325, 725, 200;
 382/49

[56] References Cited

U.S. PATENT DOCUMENTS 5,038,386  8/1991  Li ............................................ 382/49
5,058,001 10/1991  Li ........................................... 395/325
5,101,480  3/1992  Shin et al. ............................. 395/325
5,105,424  4/1992  Flaig et al. .

Primary Examiner—Debra A. Chun
Attorney, Agent, or Firm—Blakely, Sokoloff Taylor & Zafman

[57] ABSTRACT

A method and apparatus providing for data broadcasting in a two dimensional mesh of processor nodes is disclosed. In accordance with the present invention, a self-timed message routing chip is coupled to each processor node, thereby forming a two dimensional mesh of message routing chips. Broadcasting originates from a corner node, and data can broadcast through the mesh routing chips to a row, a column, or a matrix of nodes. The mesh routing chips, together, form a self-timed pipeline with each individual message routing chip having broadcasting hardware which provides for the forking of a message within that particular message routing chip. The self-timed forking of a message within individual message routing chips directly supports data broadcasting within the two dimensional mesh.

17 Claims, 8 Drawing Sheets

SELF-TIMED MESH ROUTING CHIP WITH DATA BROADCASTING

RELATION APPLICATION

This application is related to U.S. Patent application Ser. No. 07/892,550, filed Jun. 1, 1992, entitled "Method and Apparatus for High Speed Data Streaming" assigned to the same assignee, Intel Incorporated, Santa Clara, California.

BACKGROUND OF THE INVENTION

1. Field of the Invention

The present invention relates to the field of data transfers between parallel processors, and more particularly, to an apparatus and method for routing and broadcasting data in a two dimensional mesh of processor nodes.

2. Art Background:

In recent years, parallel processing computer architectures have demonstrated substantial performance advantages over more traditional sequential computer architectures. In particular, as computational needs have grown, and the performance advantages offered by parallel processing have come to be recognized, highly parallel computer architectures have generated considerable interest. One such highly parallel computer architecture comprises a two dimensional mesh of processor nodes, each of these nodes coupled to an independent processor with computing power.

Within the two dimensional mesh, data must frequently be transferred from a first processor node to a second processor node. In addition, data must frequently be broadcast from a first processor node to many or all processor nodes. This can be a time consuming task if done entirely, or even partially, in software. Implementing the broadcast function in hardware significantly reduces the time needed to complete the broadcast task and therefore, improves the performance of the entire parallel processing system.

As will be described, the present invention implements data broadcasting in hardware, with minimal software intervention. Moreover, as will be described, the present invention implements data broadcasting asynchronously within a two dimensional mesh that is self-timed. As a result, the present invention provides for a low latency network with the additional routing feature of hardware data broadcasting.

SUMMARY OF THE INVENTION

The present invention finds application in the parallel processing arts, and more particularly to data broadcasting in a two dimensional mesh of processor nodes. In particular, the apparatus and method of the present invention provides for a self-timed mesh routing chip which accomplishes data broadcasting in hardware rather than software. In accordance with the present invention, a mesh routing chip designed in accordance with the present invention is coupled to each processor node, thereby forming a mesh of routing chips. Each message routing chip includes a Processor port coupled to the processor node, and four separate routing ports, a North routing port, an East routing port, a West routing port, and a South routing port, for routing messages in one of four directions within the mesh.

Each message routing chip is designed to facilitate the sending of a message from one processor node to another processor node in the two dimensional mesh in hardware. In addition, in accordance with the present invention, each message routing chip is further designed to facilitate the broadcasting of data from a first processor node to a number of other processor nodes in hardware. The broadcasting of data originates from a "corner" processor node within the mesh to a row of processor nodes, a column of processor nodes, or a matrix of processor nodes. In particular, data can be broadcast to a row of processor nodes in the X dimension either in the positive or negative direction with respect to the "corner" processor node, inclusive of the column in which the "corner" processor node is located. In a similar fashion, data can be broadcast to a column of processor nodes in the Y dimension in either the positive direction or negative direction with respect to the "corner" processor node, inclusive of the row in which the "corner" processor node is located. Data can additionally be broadcast to a matrix of processor nodes in one of four quadrants with respect to the "corner" processor node, inclusive of the row and column in which the "corner" processor is located.

In accordance with the present invention, when a message is first received by a message routing chip at the processor port, the first word of the message includes the displacement, in nodes, in the X dimension, a sign bit indicating in which direction the message must travel in the X dimension, and a broadcast bit which specifies whether the message should be broadcast in the X dimension. The second word in the message is the displacement in nodes in the Y dimension, a sign bit indicating in which direction the message must travel in the Y dimension, and a broadcast bit which specifies whether the message should be broadcast in the Y dimension. In accordance with the method of routing in the present invention, a message is always routed in the X dimension first within the two dimensional mesh before the Y dimension. The size of the first and second words is implementation dependent. In one embodiment, it is 16 bits wide.

The individual mesh routing chip of the present invention incorporates a number of broadcasting blocks within the chip. The message routing chip further incorporates arbiter blocks, stripper blocks, and decrementer blocks. Together, these blocks provide for the forking of a message within an individual message routing chip, which in turn, supports hardware broadcasting within the two dimensional mesh.

BRIEF DESCRIPTION OF THE DRAWINGS

Further details are explained below with the help of the examples illustrated in the attached drawings in which.

DETAILED DESCRIPTION OF THE INVENTION

A self-timed mesh routing chip with data broadcasting is described. In the following description, for purposes of explanation, numerous details are set forth such as specific bit values, data paths, data word sizes, and mesh dimensions, etc., in order to provide a thorough understanding of the present invention. However, it will be apparent to one skilled in the art that these specific details are not essential to the practice of the present invention. In particular, while the present invention will be described within a two dimensional mesh having certain dimensions, it will be appreciated that the present invention is in no way limited to these particular dimensions. Instead, the present invention finds application in two dimensional meshes of virtually any dimensions.

In other instances, in the description which follows, reference will be made to figures in which well known electrical structures and circuits are shown in block diagram form in order not to obscure the present invention unnecessarily. Additionally, in several instances, the term "message" is used. It should be understood that the term "message" is used in the sense that it is commonly understood in the parallel processing arts, corresponding to a packet of data or data words. It can additionally be noted that the present invention finds advantageous application in conjunction with a method and apparatus for data streaming as described in a copending patent application entitled "Method and Apparatus for High Speed Data Streaming," filed concurrently herewith, by the same named inventor.

Figure 1:
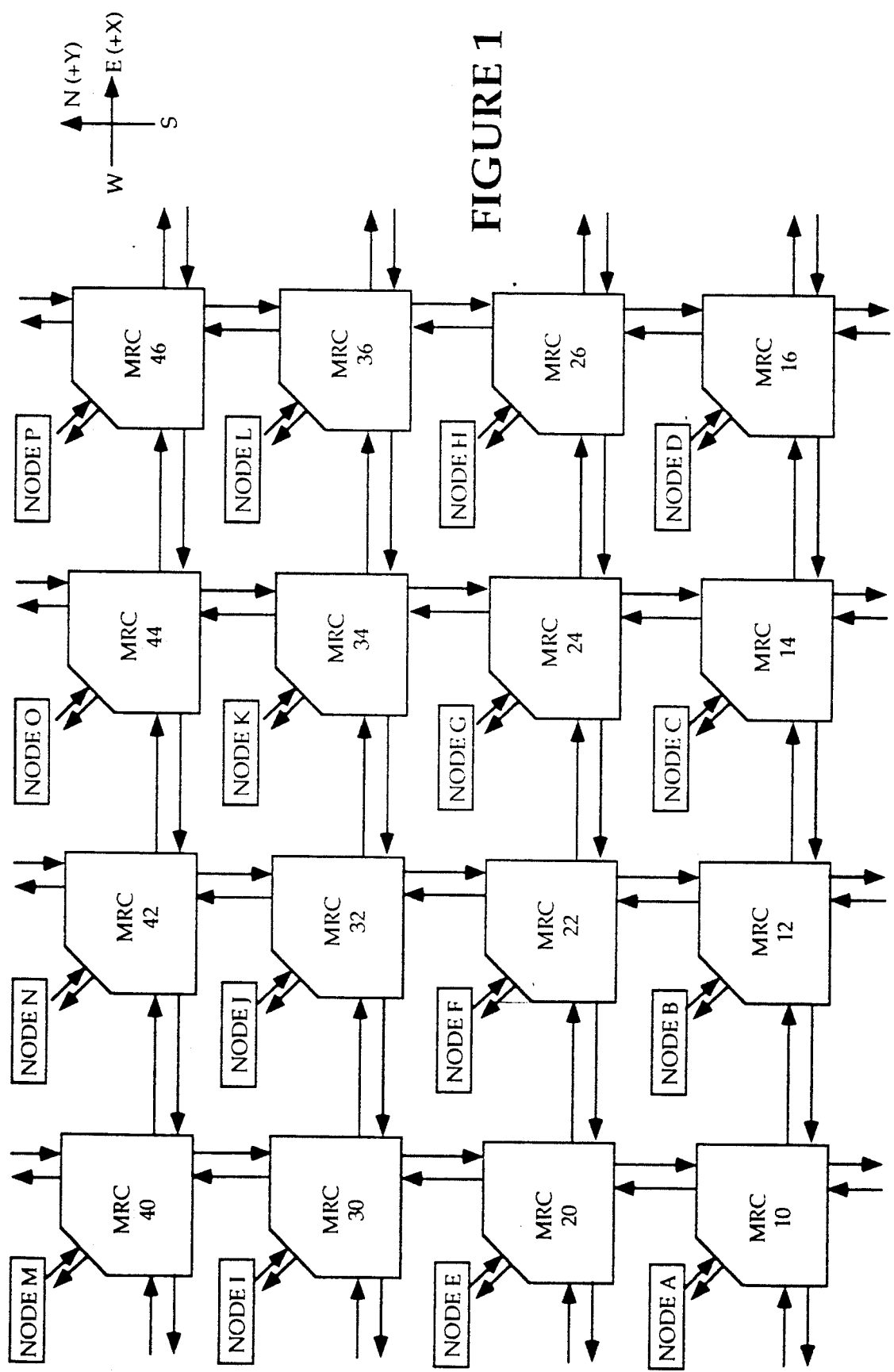
FIG. 1 illustrates a two dimensional mesh of message routing chips in accordance with the present invention.

Referring now to FIG. 1, this figure illustrates a two dimensional mesh of message routing chips in accordance with the present invention. As shown in this figure, the two dimensional mesh includes message routing chips (MRC's) 10, 12, 14, 16, 20, 22, 24, 26, 30, 32, 34, 36, 40, 42, 44, and 46. Each message routing chip (MRC) is coupled to a processor node. In particular, message routing chips (MRC) 10, 12, 14, 16, 20, 22, 24, 26, 30, 32, 34, 36, 40, 42, 44, and 46 are coupled to processor nodes A, B, C, D, E, F, G, H, I, J, K, L, M, N, O, and P respectively. Each of the processor nodes, in turn, interfaces with an associated processor (not shown) with computing power. The associated processors, together, form a larger parallel processing system. In such a system, messages or data must be transferred between the processor nodes.

The four directions in which a message can travel within the mesh architecture are designated as North, East, West, and South. Accordingly, as shown in FIG. 1, each message routing chip further includes four separate routing ports, a North routing port (N), an East routing port (E), a West routing port (W), and a South routing port (S). These four routing ports are referred to collectively as NEWS ports. Each of the four NEWS ports comprises a uni-directional input port and a uni-directional output port. When orienting a message routing chip within the mesh topology, the East direction is chosen to correspond to the positive X direction, the West direction is chosen to correspond to the negative X direction, the North direction is chosen to correspond to the positive Y direction, and the South direction is chosen to correspond to the negative Y direction. It will be appreciated that an alternative correspondence scheme can be chosen while still remaining with the scope and spirit of the present invention.

Continuing to refer to FIG. 1, each message routing chip is designed to facilitate the sending of a message or data from one processor node to another processor node in the two dimensional mesh. In addition, in accordance with the present invention, each message routing chip is further designed to facilitate the broadcasting of data from a first processor node to a number of other processor nodes within the two dimensional mesh. Each message routing chip, thus, has a processor port (P) comprising a uni-directional input port for receiving data from a processor node and a uni-directional output port for delivering data to a processor node.

In accordance with the present invention, when data is to be sent, without broadcasting, from a first processor node to a second processor node, the message routing chip coupled to the first processor node initially receives the data to be sent through the input port of its processor port (P). The data then travels through the mesh until it reaches the appropriate message routing chip coupled to the second processor node. The data is delivered to the second processor node via the message routing chip's output port. By convention in the present invention, data is first routed in the X dimension (East or West), then, in the Y dimension (North or South). For example, with reference to FIG. 1, if data is to be routed from processor node A to processor node L, the data is coupled from message routing chip 10, through message routing chips 12, 14, 16, then 26, to message routing chip 36.

In the case of broadcasting data, as will be described, the message routing chips of the present invention provide for the broadcasting of data from a "corner" processor node within the mesh to the following: a row of processor nodes, a column of processor nodes, or a matrix of processor nodes, subject to restrictions which will be described. In particular, data can be broadcast to a row of processor nodes in the X dimension, either in the positive or negative direction with respect to the "corner" processor node, inclusive of the column in which the "corner" processor node is located. For example, referring to FIG. 1, assuming processor node F is the "corner" processor node, data can be broadcast to rows consisting of the following processor nodes: (N, O); (N, O, P); (N, M); (J, K); (J, K, L); (I, J); (F, G); (F, G, H); (F, E); (B, C); (B, C, D); or (B, A). In a similar fashion, data can be broadcast to a column of processor nodes in the Y dimension in either the positive direction or negative direction with respect to the "corner" processor node, inclusive of the row in which the "corner" processor node is located. For example, referring to FIGURE 1, again, assuming processor node F is the "corner" processor node, data can be broadcast to columns consisting of the following processor nodes: (F, J, N); (F, J); (F, B); (G, K, O); (G, K); (G, C); (H, L, P); (H, L); (H, D); (E, I, M); (E, I); or (E, A). Data can additionally be broadcast to a matrix of processor nodes in one of four quadrants with respect to the "corner" processor node, inclusive of the row and column in which the "corner" processor is located. For example, assuming, again, that processor node F is the "corner" processor node, data can be broadcast to matrices consisting of the following processor nodes: (F, G, J, K); (F, G, J, K, N, O); (F, G, H, J, K, L); (F, G, H, I, K, L, N, O, P); (F, G, B, C); (F, G, H, B, C, D); (F, E, I, J); (F, E, I, J, M, N); or (F, E, B, A). The format of messages to be routed will now be described.

Figure 2:
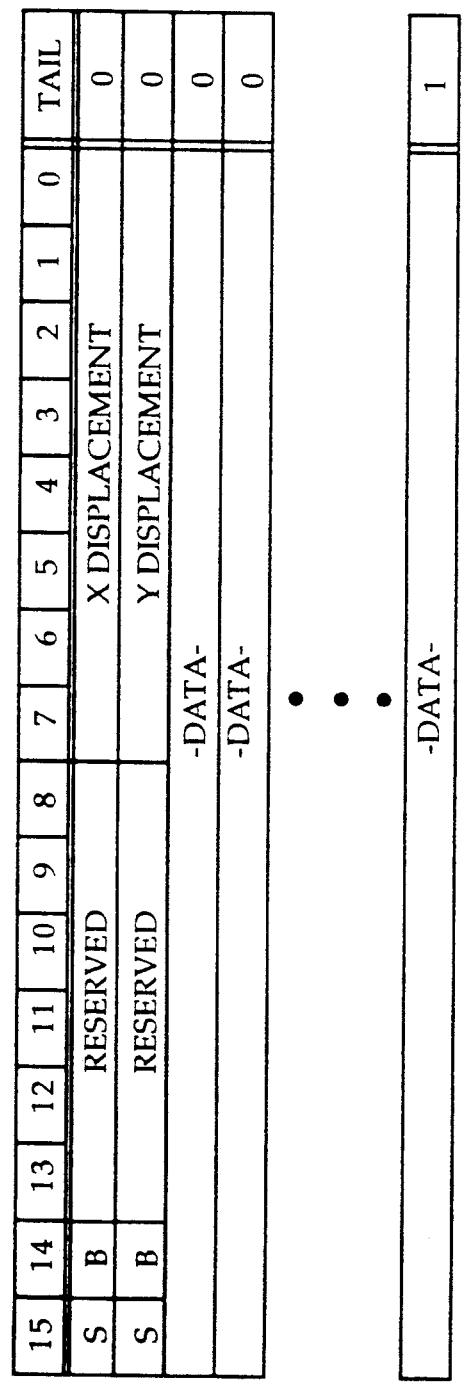
FIG. 2 illustrates the formatting of messages in accordance with the present invention.

With reference to FIG. 2, in accordance with the present invention, when a message is received by a message routing chip over the processor "in" port, the first word of the message is the displacement (in nodes) in the X dimension that the message must travel in the mesh. In the description which follows, a word is always considered to be 16 bits wide unless specified otherwise. As illustrated in FIG. 2, in the first word, the bit positions 0-7 contain the X dimension displacement. This displacement is stored as an absolute binary number, rather than two's complement format. The bit positions 8-13 are reserved. Bit position 15 contains a sign bit which indicates the direction of travel. In particular, a bit value of 0 indicates a positive direction of travel (East) and a bit value of 1 indicates a negative direction of travel (West). Thus, the X displacement, together with the sign bit, specify the displacement and direction in the X dimension which the message will travel. Bit position 14 contains a broadcast bit, which as will be described, specifies whether the message should be broadcast. In particular, a bit value of 1 in this bit position indicates that the message should be broadcast, and a bit value of 0 indicates that the message should not be broadcast.

In a similar fashion, the second word in the message is the displacement (in nodes) in the Y dimension that the message must travel in the mesh. In particular, as illustrated in FIG. 2, the bit positions 0-7 contain the Y dimension displacement. Again, this displacement is stored as an absolute binary number, and bit positions 8-13 are reserved. Bit position 15 contains a sign bit which indicates the direction of travel, with a bit value of 0 indicating a positive direction of travel (North) and a bit value of 1 indicating a negative direction of travel (South). Thus, the Y displacement together with the sign bit, specify the displacement and direction in the Y dimension which the message will travel. Bit position 14 in the second word also contains a broadcast bit, which indicates whether the message should be broadcast, with a bit value of 1 indicating that the message should be broadcast and a bit value of 0 indicating that the message should not be broadcast. The remaining words in the message contain the data to be sent or broadcast. The entire message can be of any length. The end of the message is defined by a tail bit being set to one.

Referring now to FIGS. 1 and 2, in accordance with the method of routing in the present invention, a message is always routed in the X dimension first. As the message passes through each message routing chip in the X dimension, the X displacement (first word of the message) is decremented. When a message routing chip receives a message with the X displacement equal to zero, that word is stripped off the message, and the same process starts over again in the Y dimension. As the message passes through each message routing chip in the Y dimension, the Y displacement is decremented. When a message routing chip receives a message with the Y displacement equal to zero, this word is then stripped off the message. At this point, the message is delivered to the processor "out" port. Thus, after a message has passed through the mesh and been delivered to the processor node via the processor "out" port, the message will contain two less words than the original message due to the fact that the X and Y displacement words have been stripped off.

As just described, a message is received on a processor input port of a first message routing chip, and outputted on a processor output port determined by the sign and value of the X and Y displacement words in a routing header. The present invention provides for the broadcasting function of a particular message to a number of processor nodes. In particular, with reference to FIG. 2, if the broadcast bit is set in the X displacement word of the header, the message will be delivered to all nodes in the row included in the X displacement that are at the correct Y displacement location in the mesh. Similarly, if the broadcast bit is set in the Y displacement word of the header, the message will be delivered to all nodes in the column defined by the X displacement that are included in the Y displacement. If both broadcast bits are set, the message will be delivered to all nodes included in the matrix defined by the X and Y displacements.

Figure 3:
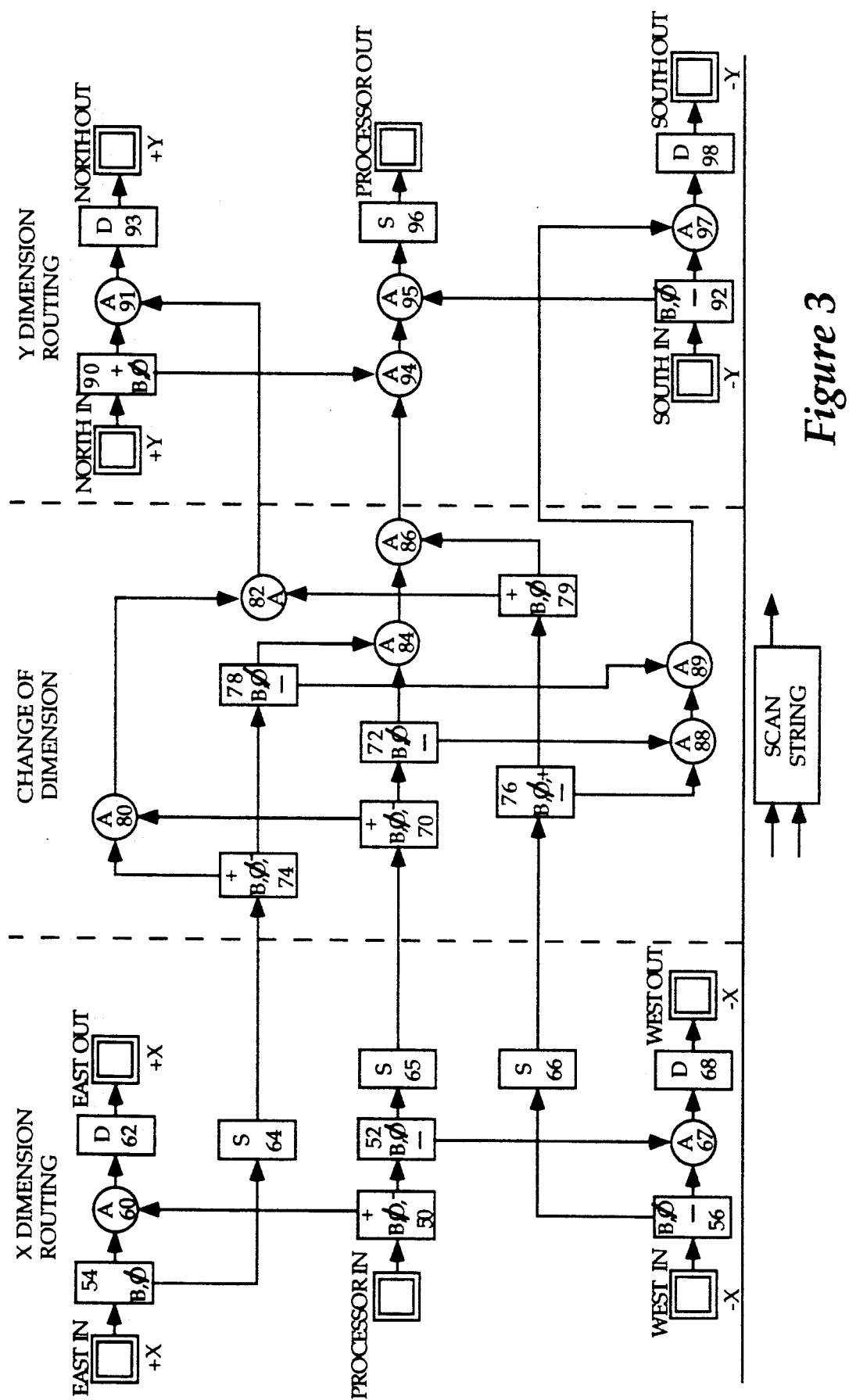
FIG. 3 illustrates, in block diagram form, the flow of a message within the message routing chip of the present invention.

Referring now to FIG. 3, this figure illustrates the message routing chip of the present invention in block diagram form. In particular, this figure illustrates the routing of a message within the message routing chip of the present invention. As illustrated, the message routing chip includes broadcast blocks 50, 52, 54, 56, 70, 72, 74, 76, 78, 79, 90, and 92. As will be described, each of these blocks allows a message entering the broadcast block to select one of two paths or both paths when leaving the block. The message routing chip shown in FIG. 3 further incorporates arbiter blocks 60, 67, 80, 82, 84, 86, 88, 89, 91, 94, 95, and 97. An arbiter block allows one of two messages to use a channel. The arbitration is such that if one incoming channel requests an outgoing channel, the waiting request will be granted when the current message's tail bit has passed. In the event that two requests occur simultaneously, the block will not grant either request until any possible metastability problems have been resolved. The message routing chip further includes decrementer blocks 62, 68, 93, and 98 which decrement the first word of each message which passes through the decrementer block. Additionally, the message routing chip incorporates stripping blocks 64, 65, 66, and 96 which strip the first word off of each message which passes through the stripper block. Also illustrated in FIG. 3 are the input and output ports for each the NEWS and processor ports.

Referring first to FIG. 1 the broadcasting of a message from a first node in the two dimensional mesh to a number of other nodes in the mesh will be described. In addition, with reference to FIGS. 2 and 3, this description will further describe the routing of the message within each individual mesh routing chip. In this description, FIG. 3 will be used generically to describe the routing of the message within each particular message routing chip presently being discussed. Referring now to FIG. 1, assume, for example, that a message is to be broadcast from processor node F to processor nodes G, K, and O. Referring to FIG. 2, in such a scenario, the first word of the message specifies a displacement in the X dimension of one, a sign bit of zero to indicate the positive direction (East), and a broadcast bit of zero indicating no broadcasting in the X dimension. The second word of the message specifies a displacement in the Y dimension of two, a sign bit of zero to indicate a positive direction (North), and a broadcast bit of one to provide for broadcasting in the Y dimension. The remaining words in the message include data, with the end of the message defined by a tail bit being set to one.

Referring again to FIG. 1, the first word of the message initially enters the processor input port of message routing chip 22. Referring now to FIG. 3, with this figure representing message routing chip 22, the first word of the message is evaluated in broadcast block 50. Because the first word of the message specifies a non-zero, positive displacement, the message is routed from broadcast block 50 through arbiter block 60 to decrementer block 62. Decrementer block 62 then decrements the displacement (which in this case is decremented from one to zero) and couples the message to the East output port.

Returning briefly to FIG. 1, when the message leaves the East output port of message routing chip 22, it is coupled to the East input port of message routing chip 24. With FIG. 3 now illustrating message routing chip 24, the message enters the East input port of this message routing chip, and is coupled to the broadcasting block 54 of this chip. Because the displacement is presently zero, the message is coupled to stripper block 64, where the first word is stripped off the message. What had previously been the second word of the message (the Y displacement) is now the first word of the message. The message is then coupled to broadcast block 74. At broadcast block 74, the message is forked, as a result of the fact that the broadcast bit is set. Focusing on a first path from this forked, because the broadcast bit is set, the message is coupled in sequence through broadcast block 78, arbiter 84, arbiter 86, arbiter 94, arbiter 95, stripper 96, where the first word of the message (now the Y displacement) is stripped off the message, and the processor output port. Thus, referring briefly to FIG. 1, the message is output of message routing chip 24 to processor node G.

Focusing now on the second path, because the Y displacement value at broadcast block 74 is a non-zero, positive value, the message is also sequentially coupled through arbiter 80, arbiter 82, arbiter 91, decrementer 93 where the displacement is decremented by one (from two to one), and the North output port. Continuing to describe this second path with reference to FIG. 1, the message is coupled from the North output port of message routing chip 24 to the North input port of message routing chip 34. With FIG. 3 now illustrating message routing chip 34, the message enters the North input port of this message routing chip and is coupled to the broadcasting block 90 of this chip. At broadcast block 90, the message forks again. Focusing on a first path, because the broadcast bit is set, the message is sequentially coupled through arbiter block 94, arbiter 95, stripper 96, where the first word of the message (the Y displacement) is stripped off the message, and the processor output port. Thus, referring briefly to FIG. 1, the message is output of message routing chip 34 to processor node K.

Focusing now on the second path from broadcast block 90, because the Y displacement value at broadcast block 90 is a non-zero positive value, the message is also sequentially coupled through arbiter 91, decrementer 93 where the displacement is decremented by one (from one to zero), and the North output port. Continuing to focus on this second path, with reference to FIG. 1, the message is coupled from the North output port of message routing chip 34 to the North input port of message routing chip 44. With FIG. 3 now illustrating message routing chip 44, the message enters the North input port of this message routing chip and is coupled to the broadcasting block 90 of this chip. At broadcast block 90, because the displacement value of the first word is zero, the message is sequentially coupled to arbiter 94, arbiter 95, stripper 96, where the first word of the message (the Y displacement) is stripped off the word, and the processor output port. Thus, referring to FIG. 1, the message is output over the processor output port of message routing chip 44 to node O. It will thus be appreciated from the preceding description that the present invention has provided for the hardware broadcasting of the message to Nodes G, K, and O. The broadcasting to rows or matrices can similarly be understood through reference to FIGS. 1, 2, and 3.

Referring now to FIGS. 4A, 4B, 4C, and 4D, these figures, taken together, illustrate the message routing chip of the present invention in further detail. As in FIG. 3, these figures show the input and output ports for the NEWS and Processor ports. Also shown are the previously described arbiter blocks and stripper blocks. Each broadcast block shown in FIG. 3, however, is further broken down in FIGS. 4A-4D into two separate broadcast cells, each designated "BCST." FIGS. 4A-4D additionally illustrate the numerous FIFO's, and parity check blocks, incorporated in the message routing chip of the present invention. Each FIFO in the message routing chip is designated with "FF," while each parity check block is designated "PAR CHK." With respect to parity checking, the message routing chip of the present invention checks for odd parity and reports an error if one is detected. In never modifies the data except by decrementing and eventually stripping off the first two words, Byte-wide parity is checked on all received words except for the first word of each message. The reason the first word is not checked is that the first word is decremented each tinge it is passed through a message routing chip in the mesh. The tail bit is grouped with the upper eight bits of each received word.

It will be appreciated that the message routing chip of the present invention does not operate in accordance with a globally distributed clock. Instead, each message routing chip is self-timed, such that an overall message routing system, comprised of a number of these chips, provides for a self-timed mesh routing system. With reference to FIGS. 1 and 4A-D, it will thus be appreciated that there are no clocks in the message routing chip of the present invention, but instead, flow through FIFO's are used. Thus, the latency is very low. With reference to FIG. 1, assuming a message must be sent from Node A to Node P, in accordance with the present invention, that message would travel through message routing chips 10, 12, 14, 16, 26, 36, and 46. Unlike certain communication networks, the present invention does not repeatedly "store and forward" this message. It does not send the entire message from message routing chip 10 to message routing chip 12, then send the entire message from message routing chip 12 to message routing chip 14, then send the entire message from message routing chip 14 to message routing chip 16, and so on, until message routing chip 46 is reached. Instead, the present invention routes the message as a contiguous string of data words (or what might be termed a "worm") and routes this contiguous string of data words in a self-timed fashion, through a number of message routing chip having a number of FIFO's that are not very deep. The path the message takes from the sending processor node to the destination processor node, can thus be thought of as a pipeline made up of FIFO's, with each message routing chip contributing a certain number of pipes or FIFO's. The overall message routing system can also be thought of as a type of "wormhole" routing network, wherein the head of the message (worm) can be at the destination processor node while the tail of the message (worm) can still be at the sending processor node. It will thus be appreciated that within such a self-timed mesh router system, if a message is to be broadcast, that message must fork within an individual message routing chip and proceed in two different directions at the same time.

Figure 4A:
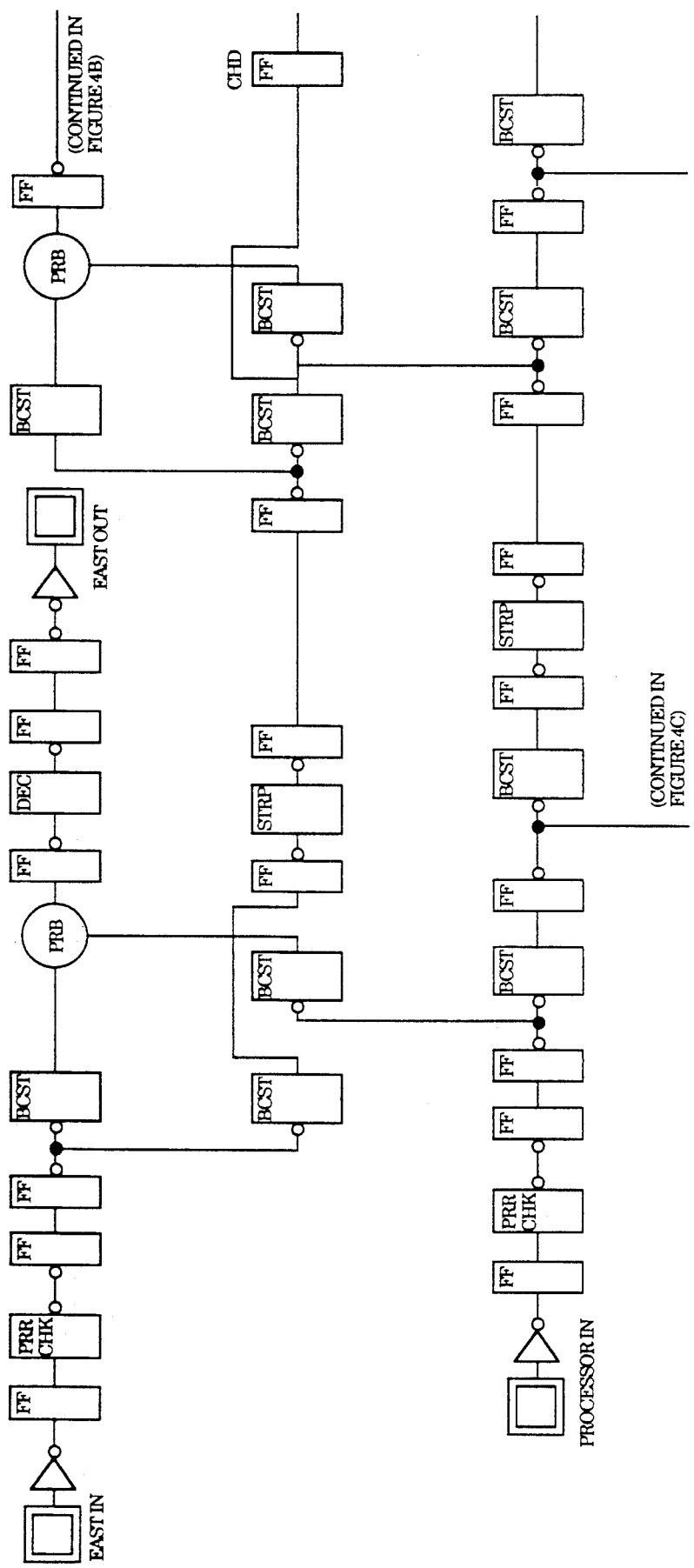
FIGS. 4A-4D illustrate, in further detail, the self-timed flow of a message within the message routing chip of the present invention.
Figure 4B:
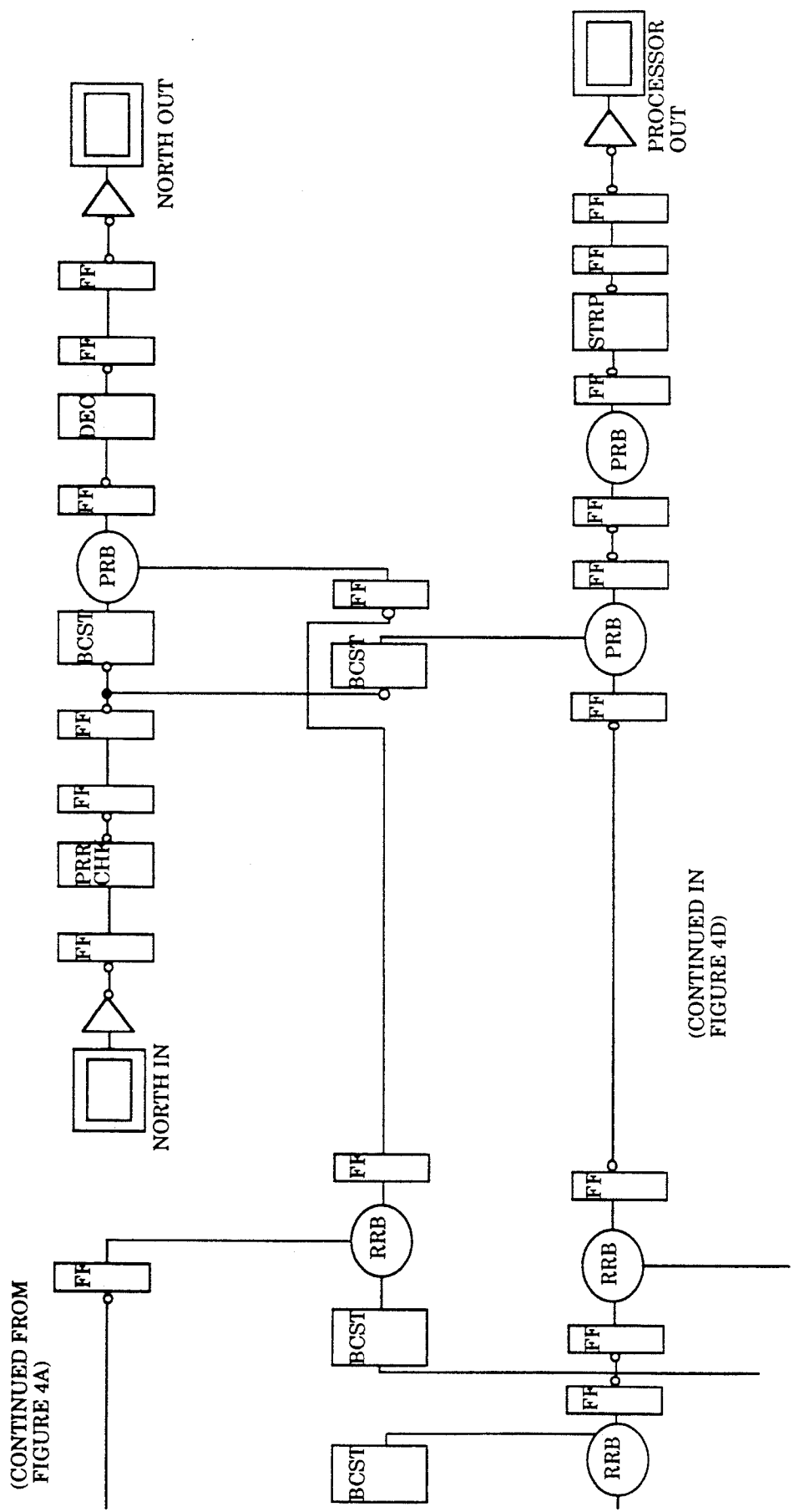
Figure 4C:
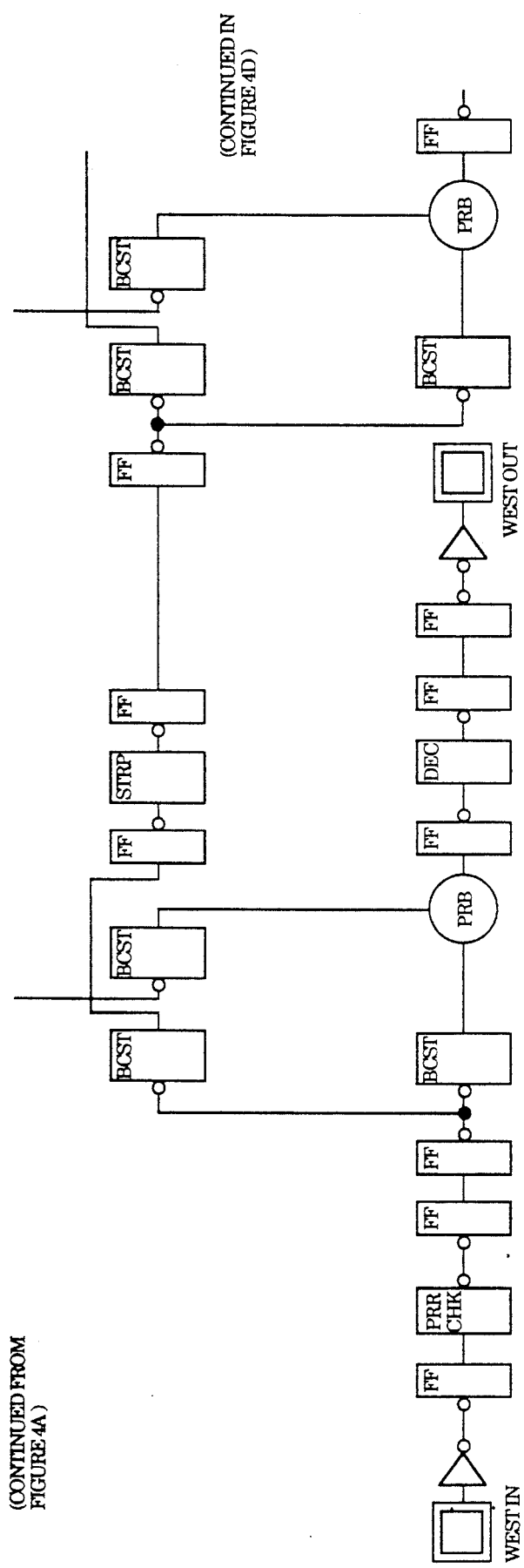
Figure 4D:
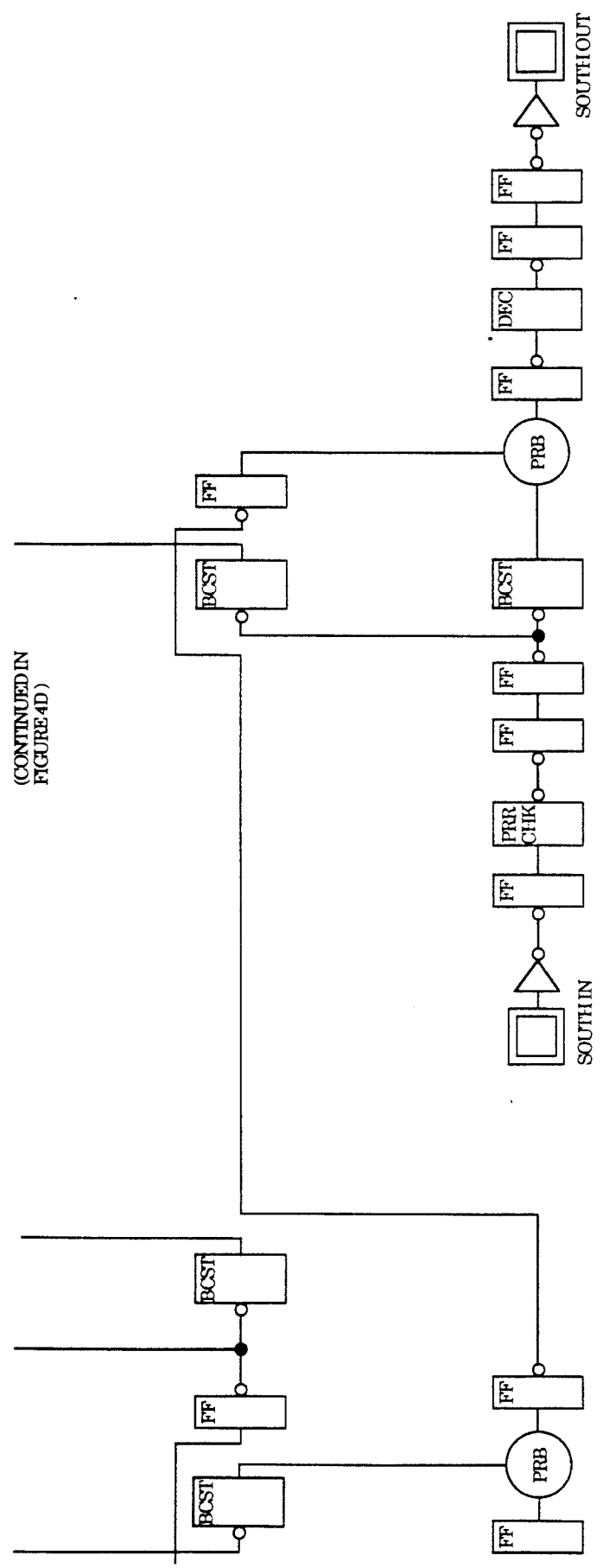
Figure 5:
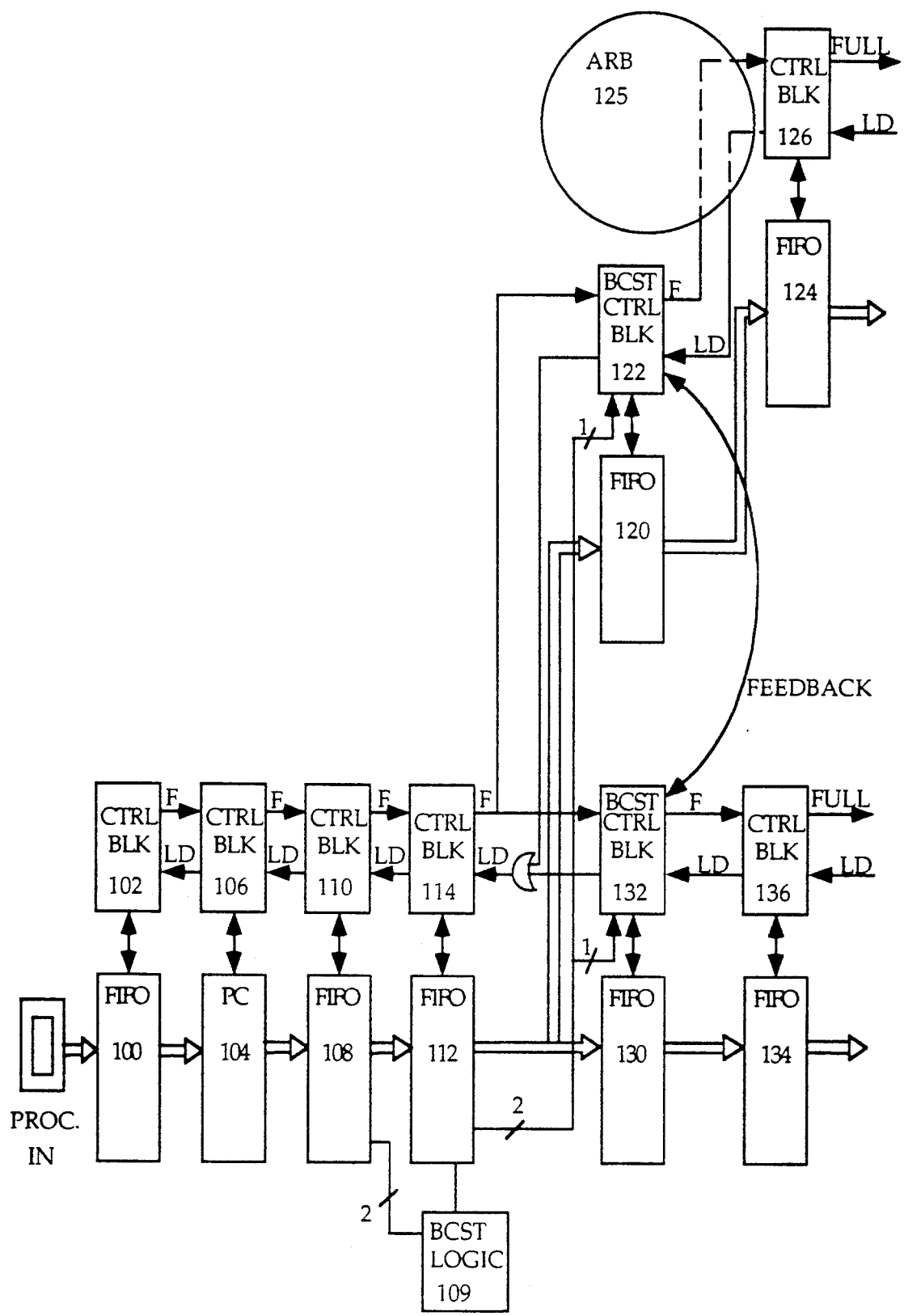
FIG. 5 shows in greater detail how the words in a message are forked within the message routing chip of the present invention.

Referring now to FIG. 5, this figure illustrates in further detail, the portion of the message routing chip encompassed within the dotted lines shown in FIG. 4A. More particularly, FIG. 5 illustrates the method and apparatus of the present invention which provides for the forking of a message within a broadcasting block. As shown in this figure, the words of a message which are received in the processor input port, are sequentially coupled to FIFO 100, parity check block 104, FIFO 108, and FIFO 112. Each of these operates under the control of a separate control block. In particular, control block 102, control block 106, control block 110, and control block 114 are coupled to and control the loading of FIFO 100, parity check block 104, FIFO 108, and FIFO 112, respectively. At any given time, each of control blocks 102, 106, 110, and 114 is in one of two states: either full or empty. At start-up these control blocks are initialized to be in an empty state.

When the first word of a message is received in FIFO 100, control block 102 changes to a full state, and couples a FULL signal to control block 106. If control block 106 is in an empty state (as it would be following start-up), in response to the FULL signal, it couples a LOAD signal (LD) to control block 102 and causes parity check block 106 to load the first word of the message front FIFO 100. The LOAD signal (LD) communicates to control block 102 that the word has been loaded into parity check block 104, and the LOAD signal (LD) causes control block 102 to be cleared to an empty state. Once in this empty state, control block 102 is able to load the next word in the message into FIFO 100.

Following the issuance of the LOAD signal (LD), control block 106 changes into a full state, and couples a FULL signal to control block 110. If control block 110 is in an empty state, it couples a LOAD signal (LD) to control block 106, and causes FIFO 108 to load the word from parity check block 104. As before, this LOAD signal (LD) communicates to control block 106 that the word has been loaded into FIFO 108, and the LOAD signal (LD) causes control block 106 to be cleared to an empty state. Once in the empty state, control block 106 is able to load the next word of the message into FIFO parity check block 104. Proceeding in this fashion, the words of the message are routed through what can be thought of as a self-timed pipeline under the control of control blocks using FULL and LOAD signals.

When a control block is already in a full state at tile tithe a FULL signal is coupled to it, as for example due to congestion ahead in the pipeline, it does not cause the loading of the word, and it does not return a LOAD signal (LD) to the preceding control block. For example, if due to congestion, control block 110 is already in a full state when a FULL signal is coupled to it from control block 106, control block 110 does not cause the word to be loaded into FIFO 108 and return a LOAD signal (LD). Instead, control block 106 simply continues to couple a FULL signal to control block 110 and awaits a LOAD signal (LD). Control block 106, thus, remains in a full state indefinitely, with the same word remaining in parity check block 104 until FIFO 108 is available to accept the word. When FIFO 108 is able to accept the word, circumstances which would correspond to the loading of the word in FIFO 108 into FIFO 112, control block 110 returns to an empty state. Following this transfer, in response to the FULL signal from control block 106, control block 110 couples a LOAD signal (LD) to control block 106 and the described process continues with the word from parity check block 104 being loaded into FIFO 108, and control block 106, therefore, being cleared to an empty state.

Looking ahead in the pipeline, it can be observed that the pipeline forks at FIFO control block 114 and FIFO 112. As will be described, broadcast control blocks 122 and 132 operate in a fashion somewhat similar to the previously described control blocks. Broadcast control block 122 is coupled to, and controls the loading operation of FIFO 120, while broadcast control block 132 is coupled to, and controls the loading of FIFO 130. Broadcast control blocks can either be in a full state or an empty state and respond to FULL signals and LOAD (LD) signals. As will be described, however, broadcast control blocks 122 and 132 are modified such that they receive and respond to additional input signals from broadcast logic 109, and receive and respond to signals passed between themselves.

Broadcast logic 109 comprises logic circuitry such that when the first word of a message is coupled to FIFO 108, the bits in the displacement, sign and broadcast bit positions of this first word are coupled to broadcast logic 109. Based upon these bits, broadcast logic 109 couples one signal to broadcast control block 122 and another signal to broadcast control block 132 which indicate to these control blocks the proper directional routing the words of the message should take at this fork. These two control bits are stored in FIFO 112. Thus, when control block 114 couples a FULL signal to broadcast control blocks 122 and 132, the control signals from broadcast logic 109 determine whether either, or both, broadcast control blocks 122 or 132 will load the word into their respective FIFO's. Thus, the signals from broadcast logic 109 tell broadcast control block 122 whether to respond to a FULL signal from control block 114 by loading the word into FIFO 120, and tell broadcast control block 132 whether to respond to a FULL signal from control block 114 by loading the word into FIFO 130. For example, if in the first word of the message, the broadcast bit is not set, and the sign bit is positive, in response to this condition, broadcast logic 109 couples signals to control blocks 122 and 132 such that: control block 122 will respond to a FULL by loading the words of the message through FIFO 120, while 132 will ignore the FULL signal and not load the words of the message through FIFO 130.

It will be appreciated that the forking of a message into two separate self-timed pipelines raises a potential problem when one of the pipelines congested. Assume for example, that the pipeline which includes FIFO 120 and FIFO 124 is congested, while the pipeline which includes FIFO 130 and 134 is not congested. If broadcast control blocks 122 and 132 operate completely independent of one another, the words of the message will continue to stream through the pipeline which includes FIFO 120 and FIFO 124, and forever be lost to the pipeline which includes FIFO 130 and 134. This result is avoided in the present invention through the use of feedback between broadcast control blocks 122 and 132, such that in the event that the words of a message are forked into both pipelines, neither one of the broadcast blocks will issue a LOAD signal (LD) unless both broadcast blocks are in an empty state. Also as shown in FIG. 5, the LOAD signals from control blocks 122 and 132 can be coupled to a logical OR gate, the output of which is coupled to control block 114.

It will thus be appreciated that the present invention provides for a self-timed mesh routing chip with hardware broadcasting. It will further be appreciated that the present invention provides for a low latency method and apparatus which is considerably faster than software methods of accomplishing data broadcasting in a two dimensional mesh of processor nodes. While the present invention has been particularly described with reference to FIGS. 1 through 5, it should be understood that the figures are for illustration only and should not be taken as limitations upon the invention. It is further contemplated that many changes and modifications may be made to the invention, by one of ordinary skill in the art, without departing from the spirit and scope of the invention as disclosed herein.

I claim:

1. In a mesh comprising a plurality of processor nodes, a method for broadcasting a message from a first processor node to at least two processor nodes comprising the steps of:

coupling a message from a first processor node to a first message routing means, said message comprising a plurality of data words, said plurality of data words comprising a first data word and a second data word, said first data word comprising a plurality of bits specifying a first displacement with respect to said first processor node in a first dimension in said mesh, a first sign bit specifying a direction of travel in said first dimension, and a first broadcast bit specifying whether said message would be broadcast to a plurality of processor nodes in said first dimension;

said second data word comprising a plurality of bits specifying a second displacement with respect to said first processor node in a second dimension in said mesh, a second sign bit specifying a direction of travel in said second dimension, and a second broadcast bit specifying whether said message should be broadcast to a plurality of processor nodes in said second dimension;

selectively broadcasting said message from said first message routing means to said at least two processor nodes through at least two message routing means, each of said at least two message routing means being coupled to a corresponding one of said at least two processor nodes, if only said first broadcast bit is set, said at least two processor nodes being disposed in said first dimension at said second displacement;

if only said second broadcast bit is set, said at least two processor nodes being disposed in said second dimension at said first displacement;

if said first and second broadcast bits are set, said at least two processor nodes being disposed in a matrix in said first and second dimensions, the matrix being defined by the first processor node, the first displacement in the direction specified by the first sign bit, and the second displacement in the direction specified by the second sign bit.

2. The method as provided in claim 1, wherein each of said at least two message routing means through which said message is broadcast comprise at least one a synchronous FIFO, at least one data word of said message passing through each FIFO.

3. The method as provided in claim 1, wherein said first data word and said second data word are stripped off said message before being coupled to said at least two processor nodes.

4. A self-timed message routing system for broadcasting messages in a mesh of processor nodes, said system comprising:

a plurality of message routing means, each of said message routing means coupled to a processor node in said mesh, said plurality of message routing means comprising a first message routing means coupled to a first processor node in said mesh, said first message routing means comprising means for receiving a message from said first processor node, said message comprising a plurality of data words, said plurality of data words including a first data word and a second data word, said first data word comprising a plurality of bits specifying a first displacement with respect to said processor node in a first dimension in said mesh, a first sign bit specifying a direction of travel in said first dimension, and a first broadcast bit specifying whether said message should be broadcast to a plurality of processor nodes in said first dimension;

said second data word comprising a plurality of bits specifying a second displacement with respect to said processor node in a second dimension in said mesh, a second sign bit specifying a direction of travel in said second dimension, and a second broadcast bit specifying whether said message should be broadcast to a plurality of processor nodes in said second dimension;

wherein said message is selectively broadcast from said first processor node to at least two processor nodes through said plurality of message routing means, if only said first broadcast bit is set, said at least two processor nodes being disposed in said first dimension at said second displacement;

if only said second broadcast bit is set, said at least two processor nodes being disposed in said second dimension at said first displacement;

if said first and second broadcast bits are set, said at least two processor nodes being disposed in a matrix in said first and second dimensions, the matrix being defined by the first processor node, the first displacement in the direction specified by the first sign bit, and the second displacement in the direction specified by the second sign bit.

5. The system as provided in claim 4, wherein each of said message routing means comprises at least one a synchronous FIFO, at least one data word of said message passing through each FIFO.

6. The system as provided in claim 5, wherein each of said message routing means further comprises a first decrementer means for decrementing said first displacement.

7. The system as provided in claim 6, wherein each of said message routing means further comprises a second decrementer means for decrementing said second displacement prior to outputting said message.

8. The system as provided in claim 7, wherein each of said message routing means further comprises a first stripping means for stripping said first word from said message prior to outputting said message to one of said processor nodes.

9. The system as provided in claim 8, wherein each of said message routing means further comprises a second stripping means for stripping said second word from said message prior to outputting said message to one of said processor nodes.

10. A message routing chip for routing messages in a two-dimensional mesh of at least one processor node, each of said messages comprising a plurality of data words including a first data word, said first data word including a first broadcast bit, said message routing chip comprising:

a first input port for inputting messages traveling in a first direction in a first dimension of said two-dimensional mesh;

a first output port for outputting messages to be routed in said first direction;

a second output port for outputting messages to said processor node associated with the message routing chip;

a first self-timed pipeline circuit for routing messages from said first input port to said first output port;

a second self-timed pipeline circuit for routing messages from said first input port to said second output port;

wherein said first self-timed pipeline circuit and said second self-timed pipeline circuit comprise separate and distinct pipeline circuits, said first and second self-timed pipeline circuits routing a message from said first input port to both said first output port and said second output port if said first broadcast bit is set.

11. The message routing chip for routing messages as provided in claim 10, the plurality of data words including a second data word, said second data word including a second broadcast bit, the message routing chip further comprising:

a third output port for outputting messages to be routed in a first direction in a second dimension;

a third self-timed pipeline circuit for routing messages from said first input port to said third output port;

wherein said third self-timed pipeline circuit is a separate and distinct pipeline circuit from said second pipeline circuit, second and third self-timed pipeline circuits routing a message from said first input port to said second and third output ports if said second broadcast bit is set.

12. The message routing chip for routing messages as provided in claim 10, wherein said first self-timed pipeline circuit includes a first stripper block for stripping the first word from messages prior to routing said messages to said first output port.

13. The message routing chip for routing messages as provided in claim 10, wherein said second self-timed pipeline circuit includes a second stripper block for stripping the first word from messages prior to routing said messages to said second output port.

14. The message routing chip for routing messages as provided in claim 11, wherein said third self-timed pipeline circuit includes a third stripper block for stripping the second word from messages prior to routing said messages to said third output port.

15. A message routing chip for routing messages in a two-dimensional mesh of processor nodes, said two-dimensional mesh having a first dimension and a second dimension, each of said messages comprising a plurality of data words including a first data word, said message routing chip comprising:

a first dimension routing circuit for routing in said first dimension said message;

a change of dimension routing circuit coupled to said first dimension routing circuit for changing the dimension in which said message is routed from said first dimension to said second dimension;

a second dimension routing circuit separate and distinct from said first dimension routing circuit coupled to said change of dimension routing circuit for routing said message in said second dimension;

wherein said first dimension routing circuit includes means for coupling said message from said first dimension routing circuit to said change of dimension routing circuit in the event that said first word of said message is in a first predetermined state, said first predetermined state indicating that said message has completed routing in said first dimension.

16. The message routing chip for routing messages as provided in claim 15, wherein said first dimension routing circuit receives said message from either a first direction or a second direction in said first dimension, wherein said means for coupling said message from said first dimension routing circuit to said change of dimension routing circuit comprises:

a first self-timed pipeline means for coupling said message received from said first direction to said change of dimension routing circuit; and a second self-timed pipeline means for coupling said message received from said second direction to said change of dimension routing circuit.

17. The message routing chip for routing messages as provided in claim 16, wherein:

said first self-timed pipeline means includes a first stripper block for stripping the first word from said message received from said first direction prior to coupling said message to said change of dimension routing circuit; and said second self-timed pipeline means includes a second stripper block for stripping the first word from said message received from said second direction prior to coupling said message to said change of dimension routing circuit.

* * * * *

UNITED STATES PATENT AND TRADEMARK OFFICE
CERTIFICATE OF CORRECTION

PATENT NO. : 5,333,279
DATED : Jul. 26, 1994
INVENTOR(S) : Dave Dunning

It is certified that error appears in the above-indentified patent and that said Letters Patent is hereby corrected as shown below:

Column 1  Lines 44-45   Delete "a synchronously"   Insert in place thereof --asynchronously--

Column 8  Line 28   Delete "tinge"   Insert in place thereof --time--

Column 8  Line 58   Delete "chip"   Insert in place thereof --chips, each message routing chip--

Column 9  Lines 53-54   Delete "tile tithe"   Insert in place thereof --the time--

Column 11 Line 36   Delete "would"   Insert in place thereof --should--

Signed and Sealed this

Nineteenth Day of September, 1995

Attest:

BRUCE LEHMAN

*Attesting Officer*    *Commissioner of Patents and Trademarks*